United States Patent
Tsao (10) Patent No.: US 7,379,990 B2
(45) Date of Patent: May 27, 2008

(54) DISTRIBUTED VIRTUAL SAN

(76) Inventor: Sheng (Ted) Tai Tsao, 2979 Heidi Dr., San Jose, CA (US) 95132

( * ) Notice: Subject to any disclaimer, the term of this patent is extended or adjusted under 35 U.S.C. 154(b) by 1146 days.

(21) Appl. No.: 10/713,905

(22) Filed: Aug. 12, 2002

(65) Prior Publication Data

US 2004/0215749 A1    Oct. 28, 2004

(51) Int. Cl.
*G06F 15/173*    (2006.01)
(52) U.S. Cl. .................. 709/223; 709/220; 709/225
(58) Field of Classification Search ............. 709/220, 709/225, 223
See application file for complete search history.

(56) References Cited

U.S. PATENT DOCUMENTS

2003/0182422 A1*  9/2003  Bradshaw et al. .......... 709/225

* cited by examiner

*Primary Examiner*—Jason Cardone
*Assistant Examiner*—Adnan Mirza
(74) *Attorney, Agent, or Firm*—James Wu (57) ABSTRACT

The distributed virtual SAN infrastructure provides a plurality of host systems with a scalable dynamic expandable distributed virtual storage pool, which includes a virtual storage automatic construct protocol. The distributed virtual SAN infrastructure includes one or more IP SAN units, the management console, the distributing control management station and the network infrastructure, wherein the network infrastructure provides the communication links between all systems in this distributed virtual SAN.

20 Claims, 8 Drawing Sheets

Fig. 1

The Actual Components of Distributed Virtual SAN

Fig. 2

Virtual SAN Storage Pool Automatic Configuration Protocol

Fig. 3

The UDP packet format used by "Virtual SAN Auto Configuration Protocol"

Fig. 4

Example of Storage Volume Information of an IP SAN Unit

Note: Each volume may further be partitioned into small chunk of partition.

Direct Attached Storage System:

Fig. 7

In-Band Accessed Virtual SAN

Recovery Scheme of the Distributed Virtual SAN Infrastructure

Fig. 10

DISTRIBUTED VIRTUAL SAN

FIELD OF THE INVENTION

The present invention generally relates to computer communications network. More specifically, the present invention relates to web based data storage systems.

BACKGROUND OF THE INVENTION

Figure 7:
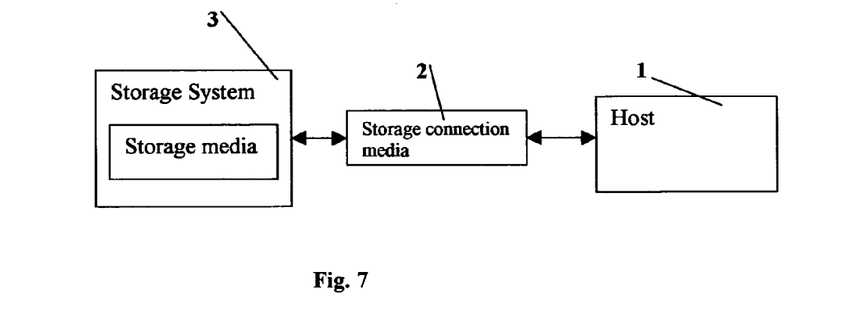
FIG. 7 is a conventional Direct Attached Storage System.

Today's corporate IT professionals typically face many challenges to handle the ever increasing information and data. To handle large amount of data, many organizations expand their storage capacity by employing manage storage systems locally in order to maintaining their normal business operating. A conventional approach is to use IP based network attached storage ("NAS"), which effectively provides data storage and services for end users. Moreover, at the enterprise level, the majority storage systems are directly attached or connected to server(s) or host(s) as shown in FIG. 7. These server(s) and/or host(s) are typically used as raw block data devices through conventional communication connection media, such as traditional IDE, SCSI, Fibre Channel, or Ethernet.

The server, which is directly attached to a storage system as illustrated in FIG. 7 typically has many drawbacks, which are described as following:

a) a typical conventional storage management system is only capable of handling 4 TB (terabytes) of data, which is usually not good enough for a typical enterprise storage management system;

b) The most of servers, which are directly attached to storage systems, have problems for further expanding their storage capacity. For example, it may require to purchase new servers in order to increase storage capacity;

c) The storage being attached to a server can only be accessed by the attached server and can not be shared by other servers even if server's storage availability is not evenly distributed across all servers within a organization;

d) Each attached storage system has to be managed separately and this is a nightmare for IT professionals;

e) With the attached storage system, the backup/restore has to go through the data network, this will tax or reduce the network performance;

f) a typical SCSI connection only allows a 12-meter distance for data accessing with 15 storage devices. Similarly, Fibre Channel is limited to 10 kilometers communication distance. Distance limitation effectively prevents them from being the best choice for disaster recovery of the storage system; and g) The Fibre Channel based storage system cannot handle well for the interoperability. Also, Fibre Channel based storage system is expensive to build and to maintain.

Figure 8:
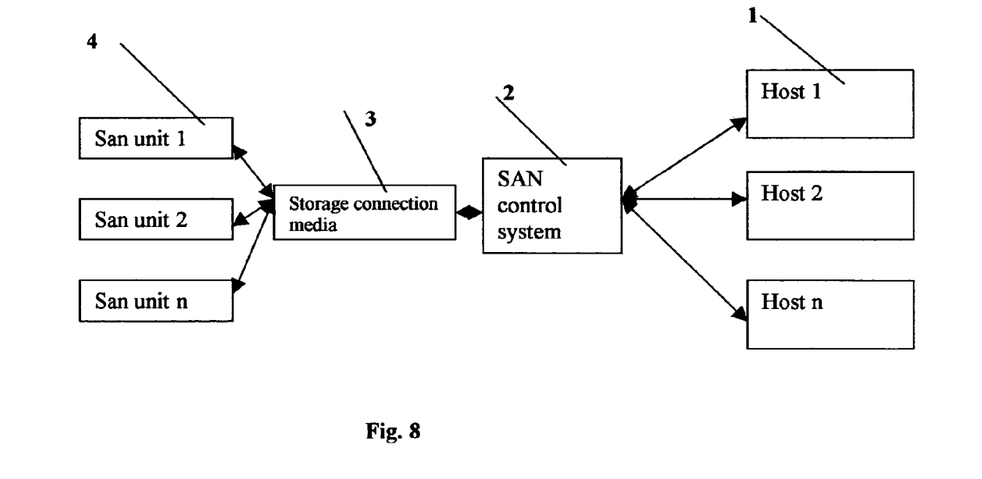
FIG. 8 is an In-Bound Accessed Virtual Storage System.

FIG. 8 shows a conventional type of virtual SAN, which is in-band controlled and accessed with which the data path from hosts (1 of FIG. 8) to the SAN units (4 of FIG. 8) going through virtual SAN control management station (2 of FIG. 8). It is not efficient in term of accessing the data by the hosts because the virtual SAN control management station can easily be a performance bottleneck. Similarly, the scalability of this type of virtual SAN is poor.

SUMMARY

Figure 9:
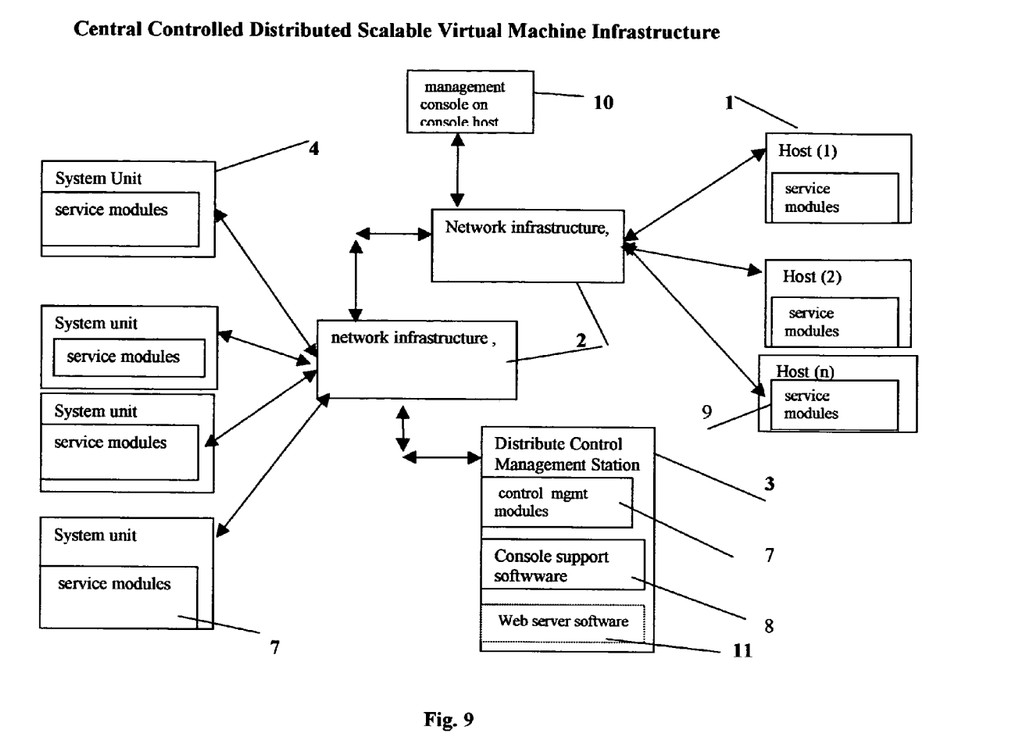
FIG. 9 illustrates a Simplified Diagram of Central Controlled Distributed Scalable Virtual Machine System in accordance with one embodiment of the present invention.

With rapid development of high speed communication technology, the problems mentioned above can be solved by an IP based out-band accessed distributed virtual SAN infrastructure (FIG. 1) of this invention. With this invention, each host (1 of FIG. 1) can directly access IP based SAN units (4 of FIG. 1) without going through control management station (3 of FIG. 1). The IP based out-band accessed distributed virtual SAN infrastructure (FIG. 1) actually represents an example of central controlled distributed scalable virtual machine system (CCDSVM) (FIG. 9). Wherein, each system units actually is a SAN unit (4 of FIG. 1), specifically is an IP based SAN unit.

Figure 6:
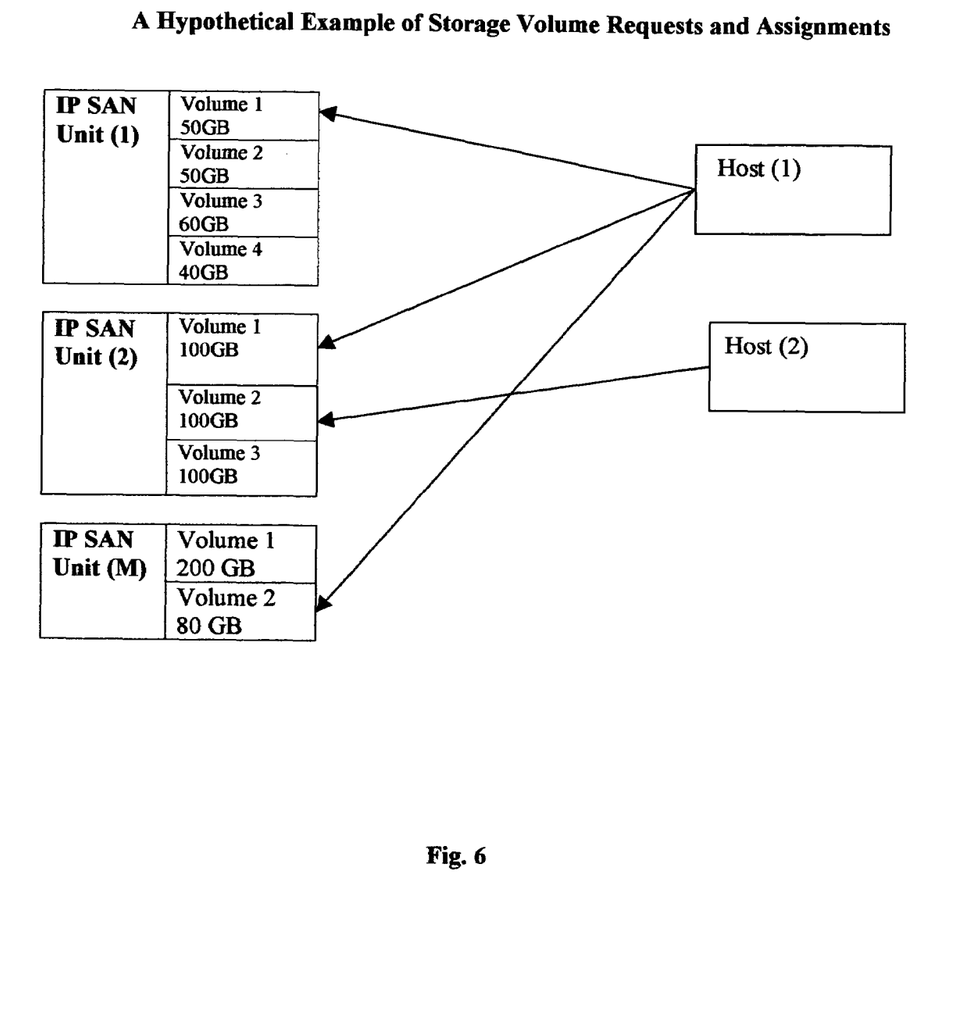
FIG. 6 illustrates a hypothetical example of Storage Volume Requests and Assignment in accordance with one embodiment of the present invention.

With this invention, each SAN unit (4 of FIG. 1) can be accessed by one or more hosts (1 of FIG. 1) and each host can access one or more SAN units (FIG. 6). In addition, the storage accessing goes directly through communication link (2 of FIG. 1) between hosts (1 of FIG. 1) and SAN units (4 of FIG. 1) without involvement of the control management station (3 of FIG. 1). Further, the SAN units (4 of FIG. 1) can be dynamically added without interrupting normal data accessing from hosts (1 of FIG. 1) and are controlled, monitored, and managed by a control management station (3 of FIG. 1) through a management console (10 of FIG. 1). The control management station (3 of FIG. 1) may also accept storage volume/partition requests from each host (1 of FIG. 1), and assign the matched volumes/partitions of SAN units (4 of FIG. 1) to these hosts. Therefore, each host (1 of FIG. 1) could directly access the right volumes/partitions of assigned SAN units without going through the control management station again.

This invention will become understood with reference to the following description, claims, and accompanying figures.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The following terms are used through out this patent application to describe the present invention. A central controlled distributed scalable virtual machine ("CCDSVM") system allows a control management station to control a group of systems and to provide distributed services to client systems over the Intranet, Internet, and/or LAN environment. Storage media includes magnetic hard disk drives, solid state disk, optical storage drive, and memory card etc. Storage connection and control media may include controller of IDE, SCSI, Fibre optical, Ethernet, USB, or wireless media, and/or other related cables etc. Each controller of storage media such as Raid, IDE, or SCSI controller may control multiple storage media drivers on a system. Storage system includes one or more storage media devices, storage connections, and/or storage media controllers. Storage system also contains related software modules for delivering storage services.

Storage area network ("SAN") is a storage system that is capable of providing block data services to various computer hosts through storage connection media, such as Fibre-optical cable, Ethernet cable or Internet Protocol ("IP") based connection media protocol or non-IP based connection media protocol. The non-IP based connection media protocol, in one example, includes Fibre-Channel. IP SAN uses IP based protocol to provide storage raw block data services. All discussions of SAN in this invention are within the scope of a model of central controlled distributed scalable virtual machine ("CCDSVM").

DNS stands for domain name server of network technology. DNS is an Internet software infrastructure and is capable of identifying network addresses for its peer systems. For example, the network addresses may be used to communicate with the peer systems. A Simple Network Management Protocol ("SNMP") is a standard Internet protocol. A SNMP trap is a user datagram protocol ("UDP") packet, which may be used to send the SNMP daemon on a SNMP agent system to a SNMP network management station via network links.

Figure 1:
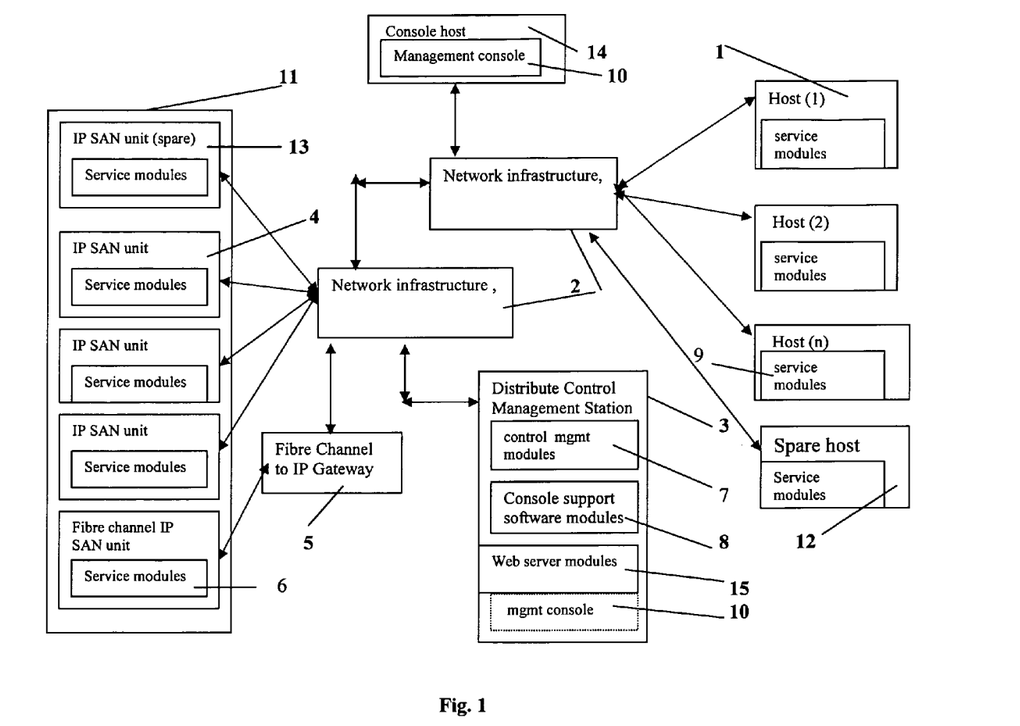
FIG. 1 illustrates a distributed virtual storage area of network ("SAN") infrastructure in accordance with one embodiment of the present invention.

FIG. 1 shows an example of a simplified block diagram of IP based out-band accessed distributed virtual SAN infrastructure. The distributed virtual SAN infrastructure includes multiple hosts (1), network infrastructures (2), a control management station (3), virtual storage pool (11) having multiple IP SAN units, and a management console (10). In one embodiment, each host (1):

contains service software modules (9). The service software modules (9) are configured to communicate with a control management software module (7) of a control management station (3) for storing information on a specific IP SAN unit (4). It also communicates with service software modules (6) of IP SAN unit (4) to retrieve a block of data from SAN units (4). The service software modules (9) can be coded or implemented with any suitable programming languages such as C, C++, Java or others. The service software modules (9) may also use any suitable protocols such as IP based or non-IP based protocols.

The host (1), in one embodiment could be a server, a desktop, a laptop PC, etc., which needs to access a block data storage. The spare host (12) represents a part of recovery scheme that could be implemented in a CCDSVM environment.

Network infrastructure (2) can be any kind of communication links which could be a department LAN, a corporate intranet, an Internet infrastructure or others. In one embodiment, network infrastructure (2) includes switches, routers, gateways, cables (Ethernet, optical Fibre), wireless communication media, or others. The network infrastructure (2) provides data path between hosts (1), distribute control management station (3), and SAN Units (4). The network infrastructure (2) also includes software infrastructure such as DNS or DHCP for facilitating systems on the net to identifying target addresses, which are used for sending or receiving data within a network domain or in a cross-domain network environment.

It should be noted that DNS and/or other Internet address identification mechanism may be used when a message or data stream is sent from a system A to a system B. In addition, the message is sent from source system A to target system B via communication link of this network infrastructure.

Control management station (3) includes distributing control management software modules (7) and console support software modules (8). To support web-based console, it requires the web server software (15). The distribute control management software modules (7) communicate with service modules (6) of IP SAN units (4) to retrieve storage information for constructing a virtual SAN storage pool (11). The communication between distributed control management software modules (7) and service modules (6) of IP SAN units (4) is further configured to monitor IP SAN unit, and to perform various system operations, which include storage configuration and partitioning etc. The control management software modules (7) also communicates with service software modules (9) of host (1) for distributing storage volumes to each hosts (1). The distribute control management software modules (7) can be implemented with any suitable programming languages such as C, C++, Java, XML, etc. The communication protocols between control management station (3) and IP SAN units (4) could be any suitable IP based protocols. The communication between control management station (3) and hosts (1) can be any suitable IP base or non-IP based protocols.

The console support software modules (8) employ inter-process communication mechanism to obtain information relating to IP SAN units (4) from the distributed control management software modules (7). The console support software modules (8) further provide information to web server software (15) through the inter-process communication mechanism. The console support software modules (8) can be implemented with any suitable programming languages such as C, C++, Java, XML, etc.

The web server software (15) communicates with management console software (10) on console host (14) through web protocol such as HTTP. The web server software (15) is configured to provide a centralized storage management capability within the entire distributed virtual SAN infrastructure for any end user over a network. The web server software (15) could be commercially available software or other proprietary software.

To simplify foregoing discussion, the communication path mentioned above will be simply referred to as console support software modules (8), which communicate (send/receive) with management console (10) on console host (14) (without further mentioning the role and function of web server software (15) on control management station).

In addition, to support non-web based console, web server software (15) on control management station (3) is often not required. In this case, the console support software modules (8) could communicate with management console software (10) with a suitable protocol other than a web protocol such as HTTP.

Figure 5:
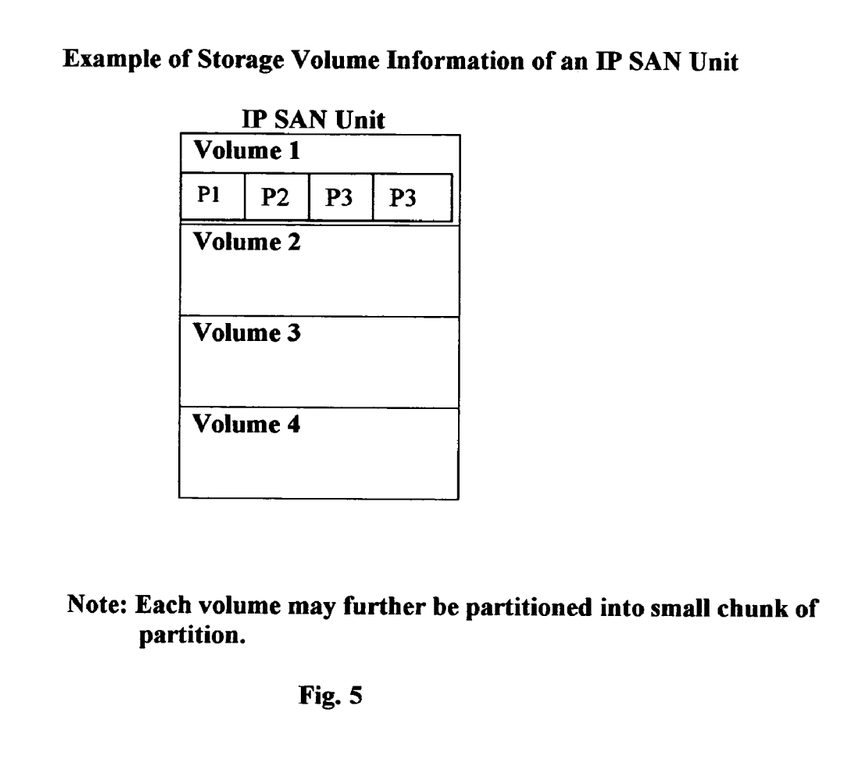
FIG. 5 illustrates an Example of Storage Volume Information of an IP SAN Unit in accordance with one embodiment of the present invention.

The virtual storage pool (11) includes multiple IP SAN units (4), wherein each IP SAN unit further includes service modules (6). The IP SAN units (4) further contain storage media, storage communications and control media. The storage hardware media of each IP SAN unit (4) is configured to have one or more logical volumes. Each volume, in one embodiment, is further partitioned into several portions, as shown in FIG. 5. The IP SAN unit (4) further contains block data services and other service software modules (6). The service software module (6) is configured to communicate with distribute control management station (3) for providing storage information and for performing storage operations. The service software modules (6), in another embodiment, are further configured to communicate with service software modules (9) of hosts (1) for providing block data services for the host (1). The service software modules (6) can be implemented by any suitable programming languages such as C, C++, Java, etc and they may employ any suitable IP based communication protocols for data transfer.

In one embodiment, the control management station (3) and organizes IP SAN units (4) to form the virtual storage pool (11). The virtual storage pool (11) may contain information relating to IP addresses, the storage volumes of the block data, their addresses and sizes of each IP SAN unit (4). A spare IP SAN unit (13) represents a part of recovery scheme used in the central controlled distributed scalable virtual machine environment.

Fibre channel to IP gateway (5) is a component that is configured to provide translation between Fibre Channel based protocol and IP based protocol so that Fibre Channel based SAN unit will appear as if IP based SAN unit to the rest of the world (FIG. 1).

Fibre channel SAN unit is similar to an IP SAN unit (4) except it uses Fibre Channel storage control, which uses Fibre Channel protocol to communicate with other parties over the network. In addition, Fibre Channel SAN unit appears as an IP based SAN unit to the distributed virtual SAN once it connects to a Fibre Channel to IP gateway (5 of FIG. 2). Therefore, to simplify the foregoing discussion, a fibre channel SAN unit will be treated similarly as an IP SAN unit in all of following discussion without additional comments.

The management console on console host (14), which has been described in pending patent of "Concurrent Web Based Multi-Task Support for Control Management System" by the same author. The management console could be a commercially available web browser or a proprietary Web browser. A web browser is able to communicate with web server software (15) on control management station (3) through a web protocol such as HTTP. The Web browser could be implemented by any suitable programming languages such as C, C++, Java, XML, etc. In addition, the management console software module (10) could be a networked software module and/or web browser software. In this case, any other suitable network protocols can be used instead of using web protocol such as HTTP.

To simplify the foregoing discussion, the communication path between management console (10) on console host (14) and the console support software modules (8) on control management station (3) will not further mention the role or function of web server software module (15) in this invention.

From management console (10), multiple concurrent system operations and tasks can be performed for the entire distributed virtual SAN infrastructure. There are may be one or more management consoles of distributed virtual SAN infrastructure anywhere on the net.

Figure 2:
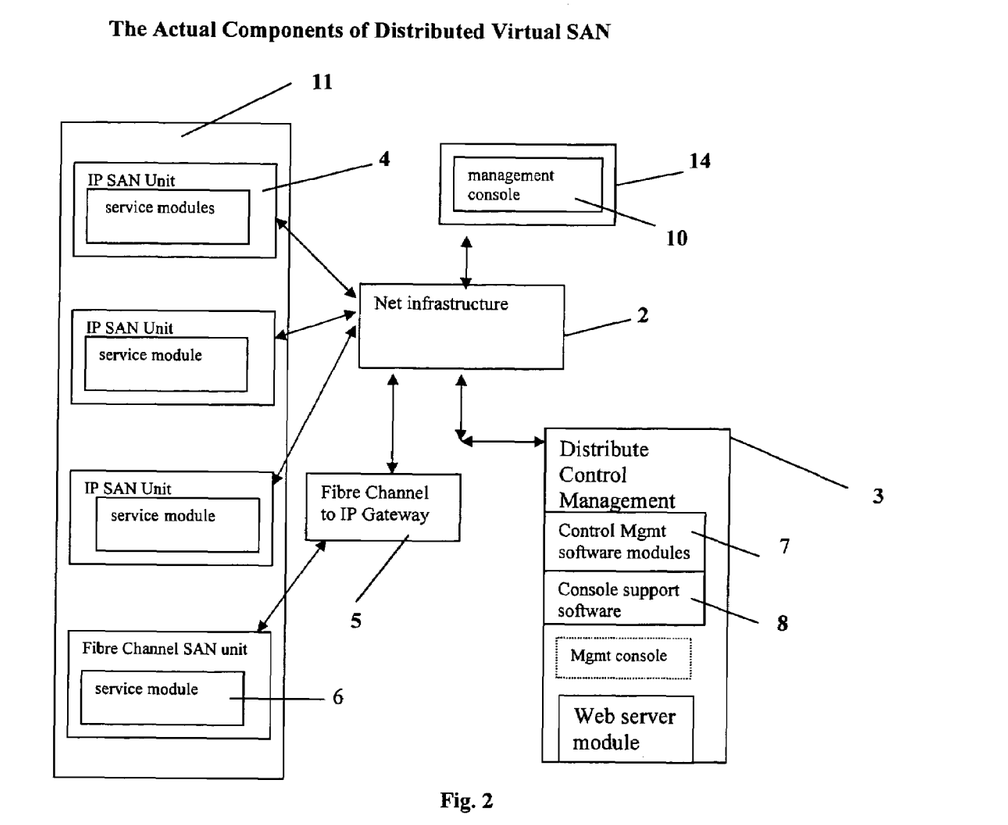
FIG. 2 illustrates actual Components of Distributed Virtual SAN in accordance with one embodiment of the present invention.

FIG. 2 illustrates a portion of FIG. 1 relating to an actual virtual SAN. The multiple SAN units form a virtual Storage pool (11). The virtual storage pool (11) may contain information of each IP SAN unit's IP address, the storage volumes and their sizes, etc.

Figure 3:
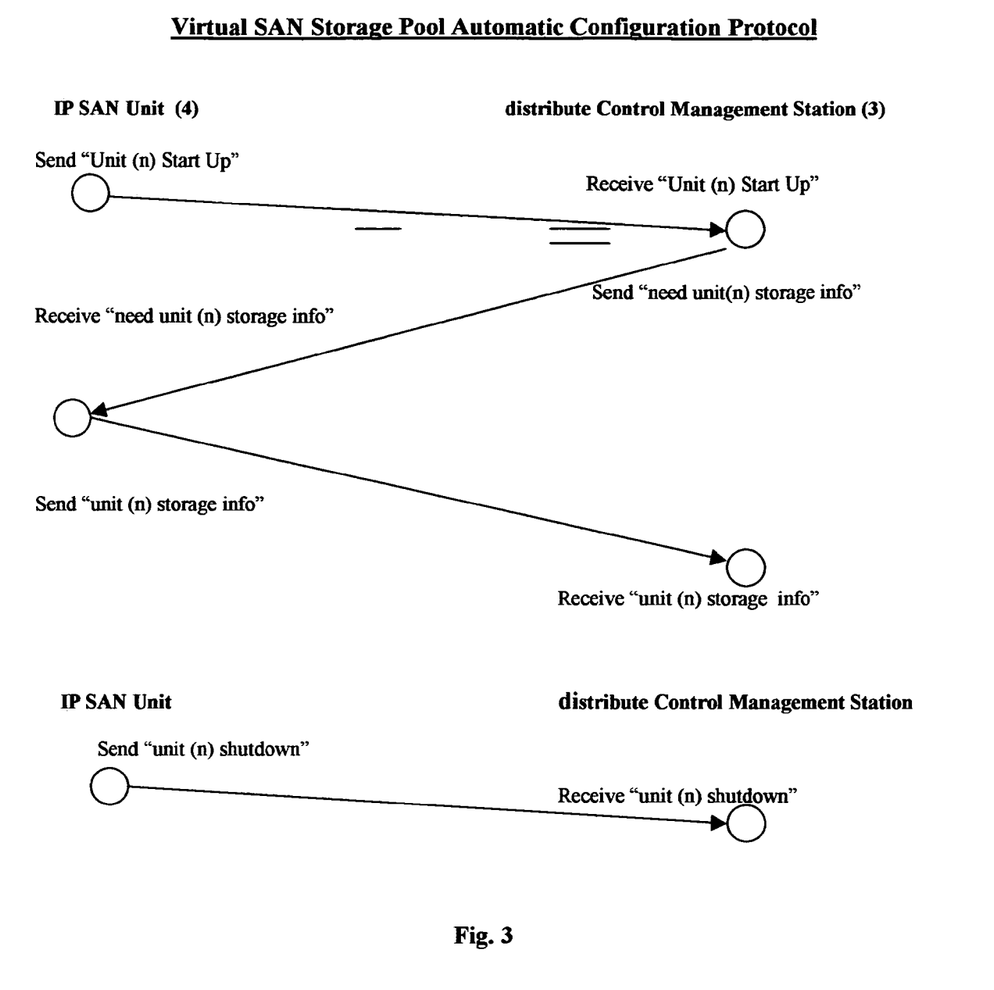
FIG. 3 illustrates Virtual SAN Automatic Configuration Protocol in accordance with one embodiment of the present invention.

FIG. 3 shows a protocol of virtual SAN automatic configuration and building as well as shutting down a virtual SAN. The packet format used with this protocol is described in FIG. 4.

Figure 4:
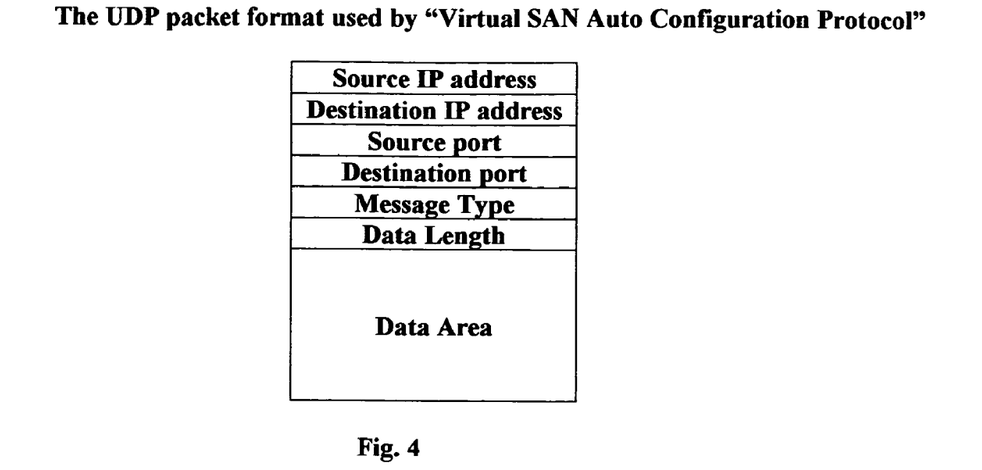
FIG. 4 illustrates a Virtual SAN Auto Configuration Protocol Packet format in accordance with one embodiment of the present invention.

FIG. 4 shows the message format, which is used by "Virtual SAN Automatic Configuration Protocol" for sending and receiving a packet.

FIG. 5 illustrates a storage layout in an IP SAN unit, wherein the storage layout may be further divided into multiple volumes and each volume may be further divided into multiple partitions. Each volume refers to a logical storage unit in this discussion and it might contain multiple pieces of storage space from multiple storage hardware media.

FIG. 6 is a simplified and a portion of FIG. 1, which shows a hypothetical example of how hosts are configured to access the Storage Volume of IP SAN units. Where each IP SAN unit is a portion of virtual storage pool (11 of FIG. 2) and each host is substantially the same as presented in FIG. 1.

FIG. 8 is a block diagram illustrating an In-Band Accessed Virtual SAN. FIG. 8 shows another type of virtual SAN, wherein, the actual storage data path from hosts to IP SAN units has to go through control management station.

FIG. 9 is a Simplified Diagram of Central Controlled Distributed Scalable Virtual Machine. With this invention, the systems in a CCDSVM can be flexibly organized into multiple different service pools according to their functionalities. For example, multiple IP SAN units can form a virtual SAN storage pool. The hosts of CCDSVM could form other service pools to provide services other than storage services such as video services, security monitor services, and all other services provided on Web (or net).

Figure 10:
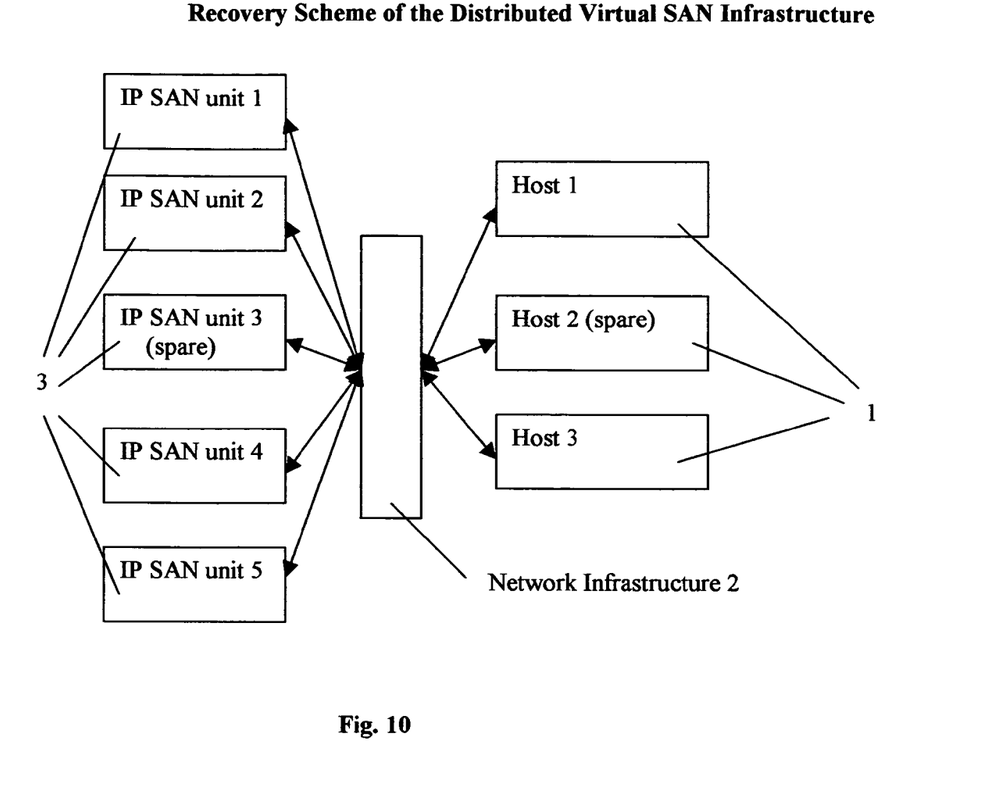
FIG. 10 illustrates a Simplified Diagram of Disaster Recovery Scheme of Distributed Virtual SAN Infrastructure in accordance with one embodiment of the present invention.

FIG. 10 is a Simplified Diagram of Disaster Recovery Scheme of Distributed Virtual SAN Infrastructure, which includes one virtual storage pool of multiple IP SAN units and one service pool of multiple hosts. For example, host 1 accesses IP SAN units 1 and 2 while host 3 accesses IP SAN units 4 and 5. Also, IP SAN unit 1 and 2 are mirrored so that they have kept the same copy of data for host 1. The same to be true for IP SAN unit 4 and 5 with host 3. In addition, IP SAN unit 3 may be a spare unit and the host 2 could be a spare host.

FIG. 1 shows a simplified diagram of a distributed virtual SAN infrastructure according to the present invention. With the distributed virtual SAN infrastructure, the distributed virtual SAN storage pool (11) comprises one or more SAN units (4), which may be further connected to a distribute control management station (3). The SAN units (4) can be accessed by one or more hosts (1) via network infrastructure (2). The entire distributed virtual SAN infrastructure can be operated through management console (10).

The virtual storage volume pool (11) of the distributed virtual SAN infrastructure (FIG. 1) can be initiated and updated when each of the IP SAN units (4) is booted and brought to online. The virtual storage volume pool (11), in one embodiment, is updated when at least one of IP SAN unit is powered down or removed from the web environment. FIG. 3 shows the distributed Virtual SAN Automatic Configuration Protocol, which leads to the success of constructing the virtual storage pool (11) of distributed virtual SAN infrastructure (FIG. 1) according to this invention. The following steps have described the automatic building sequence of storage volume pool of the virtual SAN based on this protocol (FIG. 3). The protocol described bellow could be IP based protocol such as SNMP, or a much simple UDP protocol (FIG. 4), or any other suitable protocols.

When any of IP SAN unit (4) such as unit (n) brought up online, SAN service modules (6 of FIG. 2) of the IP SAN unit (4) sends out a "SAN unit (n) startup" packet, as illustrated in FIG. 4, to distribute control management station (3 of FIG. 1). The "SAN unit (n) startup" packet could be a simple user defined UDP packet (FIG. 4) indicating a system just being powered up. The message carried by the packet could also be a SNMP trap of cold start packet, or link-up packet (4 of FIG. 1) or other short packet/message of any suitable IP protocols.

When distribute control management modules (7 of FIG. 1) of distribute control management station (3 of FIG. 1) receives IP SAN unit (n)'s message, it stores the IP SAN unit (n)'s information.

After storing information of the IP SAN unit, the control management modules (7 of FIG. 1) on distribute control management station (3 of FIG. 1) sends back a "need SAN unit (n)'s storage info" packet to IP SAN unit (n) (4 of FIG. 1).

When SAN service modules (6 of FIG. 1) on IP SAN unit (n) (4 of FIG. 1) receive the packet of "need SAN unit (n)'s storage info", they obtain the storage information on the IP SAN unit (n) (4 of FIG. 1), which may include the number of storage volumes, each volume's starting address (logical block address, LBA), length, and the end address (logical block address, LBA). The SAN service modules (6 of FIG. 1) then send back a packet of "unit (n) storage info", which may include all information obtained from the control management station (3 of FIG. 1).

After receiving the "unit (n) storage info" packet from IP SAN unit (n) (4 of FIG. 1), the distribute control management modules (7 of FIG. 1) on distribute control management station (3 of FIG. 1) update the stored information of virtual storage pool (11 of FIG. 1) with corresponding storage information of IP SAN unit (n) from packet.

When any one of IP SAN unit (n) is shutting down, the service module (6 of FIG. 1) of the IP SAN unit (n) (4 of FIG. 1) sends a "Unit (n) shutdown" message to the distribute control management station (3 of FIG. 1). This shutdown message could be an SNMP trap of link down, or a simple UDP packet (FIG. 4) with message type of system down, or other short packet based on some other protocols.

After receipt of the "unit (n) shutdown" packet from IP SAN unit (n) (4 of FIG. 1), the distribute control management modules (7 of FIG. 1) on distribute control management station (3 of FIG. 1) update information of the virtual storage pool (11 of FIG. 1) which is specific to the IP SAN unit (n) (4 of FIG. 1).

After one or more IP SAN units (4 of FIG. 1) are online, the control management station (3 of FIG. 1) obtains and/or stores information relating to storage volumes and networking protocols for every IP SAN unit (4 of FIG. 1) in the virtual storage pool (11 of FIG. 1). Therefore, the control management station (3 of FIG. 1) is able to distributed storage volumes to hosts (1 of FIG. 1) in several steps.

First, the host 1 (1 of FIG. 1) sends a request to control management station (3 of FIG. 1) requesting a storage space, such as 80 GB (gigabyte) of storage. Second, the control management station (3 of FIG. 1) stores host 1 information and searches for availability of 80 GB of storage volume. The control management station (3), for example, finds an 80 GB available storage volume in volume 2 of the IP SAN unit M (FIG. 6). Third, the control management station (3 of FIG. 1) sends the requested information of host 1 to IP SAN unit M (FIG. 6), wherein the requested information includes the IP address of host 1 and the requested storage size. The control management station (3 of FIG. 1) also sends the storage volume information relating to the IP SAN unit M to host 1 (1 of FIG. 1), wherein the storage volume information includes the IP address of IP SAN unit M, the volume number and the size, the volume's starting address, and volume's ending logical address block (LBA). Therefore, all parties of threes namely the control management station (3) and host 1 and the IP SAN unit M, keep the same storage volume assignment information. Fourth, once the host 1 (1 of FIG. 1) and IP SAN unit M (FIG. 6) get each other's information, the host (1 of FIG. 1) can directly and independently access the volume 2 on IP SAN unit M immediately and the IP SAN unit M, in one embodiment, is further configured to perform security checking in light of storage accessing.

Alternatively, The above described steps may also be semi-automatically setup with assisting of system operations performed by the management console (10 of FIG. 1). For example, an administrator could initially setup volume 2 of IP SAN unit M (FIG. 6) to be exclusively accessed by host 1 (1 of FIG. 1) as long as the administrator acknowledges that host 1 needs such size of storage volume. The administrator can also setup the host 1 with all information needed to access volume 2 of IP SAN unit M (FIG. 6). Finally, the host 1 (1 of FIG. 1) can access volume 2 of IP SAN unit M (FIG. 6) directly without going through the control management station (3 of FIG. 1).

The present invention also discloses a mechanism of dynamically expanding storage capacity. After the distributed virtual SAN storage pool (11 of FIG. 1) is initiated, the host (1 of FIG. 1) will be able to access the volume of an IP SAN unit (4 of FIG. 1) in the pool (11 of FIG. 1) directly without further involvement of the control management station (3 of FIG. 1). This will allow the storage pool (11 of FIG. 1) of this distributed virtual SAN infrastructure (FIG. 1) to continue expanding without affecting any hosts (1 of FIG. 1) to continue accessing the storage volumes on assigned IP SAN units (4 of FIG. 1) in the pool. As a result, this guarantees that the distributed virtual SAN storage pool (11 of FIG. 2) can be dynamically expanded without interrupting any normal storage operations and accessing of entire distributed virtual SAN storage pool (11 of FIG. 2).

The present invention further discloses a technique of system scalability. Once the distributed virtual SAN storage pool (11 of FIG. 1) is constructed, each host (1 of FIG. 1) can access one or more IP SAN units (4 of FIG. 1) in the storage pool (11 of FIG. 1) of the distributed virtual SAN infrastructure (FIG. 1) whenever it requests. For example, host 1 (FIG. 6) can access IP SAN unit 1, unit 2, and unit M (FIG. 6) after the host (1) requests an access to the IP SAN units and subsequently, the control management station (3 of FIG. 1) grants the request. This effectively provides scalable storage system for each hosts (1 of FIG. 1) within distributed virtual SAN infrastructure (FIG. 1) of this invention. Further, the distributed virtual SAN infrastructure (FIG. 1) provides far better scalability than the in-band accessed virtual SAN (FIG. 8), wherein the scalability of in-band accessed virtual SAN were severely limited by the bottle-necked control management station (FIG. 8).

The present invention also discloses a method of storage sharing mechanism. Once the distributed virtual SAN storage pool (11 of FIG. 1) is constructed, each IP SAN unit (4 of FIG. 1) in the pool of distributed virtual SAN infrastructure (FIG. 1) may hold multiple storage volumes in the form of block data, which can be accessed by one or more hosts (1 of FIG. 1). Therefore, it allows multiple hosts (1 of FIG. 1) to share an IP SAN unit (4 of FIG. 1) by granting and assigning each host to exclusively access particular volumes on that IP SAN unit (4 of FIG. 1). The FIG. 6 demonstrates such a storage sharing, wherein IP SAN unit (2 of FIG. 6) has three volumes, which named volume 1, volume 2, and volume 3. The block data service modules (6 of FIG. 1) on IP SAN unit (2 of FIG. 6) allows volume 1 to be accessed exclusively by host1 while volume 2 to be accessed exclusively by host 2.

With in-band accessed virtual SAN (FIG. 8), the control management station could be a performance bottleneck. With distributed virtual SAN of this inventions each host (1 of FIG. 1) can directly and independently access any IP SAN unit (4 of FIG. 1). Therefore, the performance of storage accessing for each host will not be affected and can match the performance of direct attached storage system (FIG. 7) when the high speed network connecting media is deployed in the distributed virtual SAN infrastructure (FIG. 1).

The present invention also illustrates a method of a centralized management of distributed virtual SAN. The storage management console on a console host (10 of FIG. 1) can communicate with console support software module (8 of FIG. 1) on a control management station (3 of FIG. 1). The storage management console is configured to further receive information relating to all IP SAN units (4) from control management modules (7 of FIG. 1) of control management station (3 of FIG. 1). Therefore, it provides centralized management functionality for entire distributed virtual SAN storage pool (11 of FIG. 1), hosts (1 of FIG. 1), and the control management station itself (3 of FIG. 1). With multiple concurrent tasks controlled by the console support software module (8 of FIG. 1) of control management station (3 of FIG. 1), the storage management support console (10 of FIG. 1) can provide a full range of system operations and tasks. In addition, multiple system tasks and operations can be run concurrently throughout the entire distributed virtual SAN and hosts. These management tasks include storage configuration, storage volume allocation and assignment, storage partitioning and repartitioning, storage, network, and other resource usage and activity monitoring.

In one embodiment, the present invention discloses a process of disaster recovery capabilities. The use of DNS or an IP address identification mechanism helps this distributed virtual SAN infrastructure to overcome the geometric (region) limitation, and works well in a cross network domain environment or in a single network domain environment. Therefore, any IP SAN unit or host as well as a control management station could be anywhere on the corporate Intranet, department LAN, or Internet. As a result, the present invention can be used for an emergency or a disaster recovery plan because the distributed virtual SAN infrastructure increases logical range by 100 miles as oppose to the traditional 10-kilometer limitation.

In addition, the disaster recovery plan of distributed virtual SAN infrastructure can be flexibly implemented as showing in FIG. 10. With this recovery plan, the host 1 or 3 (1 of FIG. 10) can continue to operate even if one of its mirrored IP SAN units failed (3 of FIG. 10). Also, the spare IP SAN unit can be used to quickly replace the failed IP SAN unit whenever there is a need. On the other hand, the hosts (1 of FIG. 10) also can be organized into a service pool for providing special services such as distributing video services, distributed database pool, distributed security monitor services, and all other services provided on the net or the Web. Therefore, whenever host 1 or 3 failed, the spare host can quickly take over their assigned IP SAN storage and replace them to continue providing services provide service to the end user.

It should be noted that the storage of any IP SAN unit can be shared and accessed by multiple hosts. To scale a virtual storage, a host may be assigned to access multiple volumes of storage capacities from multiple IP SAN units. In one embodiment, the storage accessing goes directly through communication link between hosts and SAN units, which means that it is an out-band access. An advantage of using the present invention is that it has better performance and scalability than that in-band accessed virtual SAN. Furthermore, the present invention allows the virtual storage pool to expand dynamically through adding more IP SAN units into the pool without interrupting systems operation.

The implementation of web-based multi-concurrent tasks allows entire distributed virtual SAN infrastructure to be managed and monitored from a centralized console. Also, the IP based distributed virtual SAN infrastructure is a new type of central controlled distributed scalable virtual machine (CCDSVM). The software modules used in IP based distributed virtual SAN infrastructure are web-based operating system models. Furthermore, the methods and principles of the IP based distributed virtual SAN storage pool, which may automatic build and deliver storage services to the end users or clients on-demand bases. The present invention can also apply to various data distribution services within the CCDSVM infrastructure.

The invention claimed is:

1. A method of web-based out-band accessed central controlled distributed scalable virtual SAN for providing unlimited storage volumes on-demand and storage sharing, comprising:
    a) the control management software of control station collecting storage information from one or more unlimited SAN units based on a proprietary distributed virtual SAN automatic cross-domain configuration protocol of this invention to form virtual SAN storage pool;
    b) the console support software of control station organizing and converting the information of virtual storage pool into presentable web-format, which is transmitted to and is displayed in browser of storage management console;
    c) the console support software and control management software of control station providing privileged user from web-browser on management console of console hosts to select the management objects of any IP SAN unit in virtual SAN storage pool and its associated storage devices, storage volumes, or network cards and status, any host system and its associated devices and status, control station, its associated devices and status, and spared IP SAN units or spared hosts for managing and monitoring; and
    d) the console support software work together with control management software of control station providing two models of accepting storage volume requests from hosts and further providing each host with unlimited storage volumes whenever it requires.

2. The methods of claim 1, wherein a) the said protocol sequence for automatic constructing virtual storage pool of distributed virtual IP SAN includes
    1) when any of IP SAN units booting up, its service software of SAN sending out a "SAN unit (n) startup"

packet to distribute control management station, which includes IP address, network cards, and system name of SAN unit (n); and 2) when distribute control management software of control station receiving IP SAN unit (n) packet or it detecting a communication link being up again after the link being down, it storing the IP SAN unit (n)'s information into memory, disk or both on control station and then sending back a "need SAN unit (n)'s storage info" packet to IP SAN unit (n);

3) when SAN service modules on IP SAN unit (n) receiving the packet of "need SAN unit (n)'s storage info", it getting storage information on IP SAN unit (n), and then sending back a packet of "unit (n) storage info", which includes all information of storage device and current associated storage volumes information, to distribute control management station;

4) after receiving "unit (n) storage info" packet from IP SAN unit (n), the distribute control management modules on distribute control management station updating its stored IP SAN units with corresponding storage information of IP SAN unit (n) from packet.

3. The methods of claim 1, wherein a) the said protocol sequence for updating storage pool of distributed virtual SAN when any IP SAN unit shuts down or communication link is down, further includes:

(1) whenever any IP SAN unit (n) shutting down, the service module of IP SAN unit (n) sending "Unit (n) shutdown" to distribute control management station; and (2) after received "unit (n) shutdown" packet from IP SAN unit (n), or detected the communication link being down between said IP SAN and control station, the distribute control management software modules on control station updating the stored information for that specific of IP SAN unit (n) and for the distributed IP SAN virtual storage pool.

4. The method of claim 2, further includes the "unit (n) storage info" in packet including the number of storage volumes, each volume's start address (logical block address, LBA), volume size, and the end address (logical block address, LBA) of each volume, storage media type, IP SAN unit's IP addresses and its associated network cards information; and the startup packet being a very simple UDP packet with a "system startup message" or a SMNP cold start packet and the said control management software of control station detecting the different startup packet of different protocol.

5. The method of claim 3 further includes said "shutdown" packet being a very simple UDP packet with a "system down message" or a SMNP cold start packet and the said control management software of control station detecting and recognize the different startup packet of different protocols.

6. The method of claim 1, wherein a) further includes, (1) "Virtual SAN automatic configuration protocol" being an UDP/TCP/IP based protocol or any suitable IP based protocol with same protocol scenario and sequence for boot-up and shut-down and further controlling the capacity of virtual SAN storage pool dynamically adding or removing IP SAN units depending on the storage needs of said hosts; and (2) all packets of said proprietary protocol taking the advantage of IP address, which reaches to any point on the LAN or cross-domain Intranet, even Internet.

7. The method of claim 1, wherein b) further includes, (1) the web presentable formation being HTML, XML, WML and depending on the connection link and associated protocols between control station and the system of storage management console; and (2) the said associated protocols of HTML, XML, WML being HTTP, SOAP, WAP.

8. The method of claim 1, wherein c) further includes that, (1) the support of management console of this distributed virtual SAN provides web-based centralized management for all IP SAN units, control management station and hosts to perform tasks of storage configuration, storage volume creation, allocation and assignment, merge and split, storage partition and repartitioning, resources and processes monitoring for storage, network and all hosts; and (2) with multiple concurrent tasks supporting in console support software modules of control station, each privileged user from the web-management console takes benefit of issuing multiple simultaneous concurrent system operations and tasks.

9. The method of claim 1, wherein d) further includes a method of unlimited storage volume distribution, which comprises:

each service software module of host sending a request for a storage volume with a specific size to console support software of control management;

console support software together with control management software of control station storing the received requests coupled with the information of said each host into memory or disk storage or both on control station, and search its virtual storage volume pool to find a matched storage volume on a IP SAN unit;

after finding a right storage volume on a specific IP SAN unit for said request and validated that a corresponding said host being authorized to access the storage volume on said specific IP SAN, the said control software on control station send the said requests and the corresponding information of said each host to each said specific IP SAN;

after each party receiving required information, each said host and each corresponding said IP SAN unit initiating negotiation and further for direct access to avoid said control station to be a bottleneck for data accessing and hence to allow the control station to dedicate handling host storage requests and continuing to update, maintain and manage virtual storage volume pool.

10. The method of claim 9, further includes that a. the storage of each said IP SAN unit in virtual storage pool is configured and partitioned with multiple volumes and to be assigned to multiple hosts;

b. with support of service modules on each said IP SAN unit, multiple hosts each assigned with different volumes on a same IP SAN unit and each host exclusively accessing assigned volumes on the same IP SAN unit simultaneously without interrupt each other; and c. with said support of services modules on host, each hosts being assigned with volumes from different IP SAN units and for further accessing.

11. The method of claim 6, wherein (2) further includes that the operation of distributed IP SAN infrastructure in cross network domains environment allowing any IP SAN unit (including mirrored or spared) or any host (including spared) and control management station is anywhere on corporate Intranet, on Internet or on LAN.

12. The method of claim 1, wherein c) further includes
(1) web-based distributed virtual SAN infrastructure providing multiple hosts each with a pair of mirrored IP SAN units; and
(2) web-based distributed virtual SAN infrastructure keeping ratio of spared IP SAN unit.

13. The method of claim 1, wherein a) further includes:
(1) each IP SAN unit containing the storage media, which are magnetic disk drive, optical disk drive, solid state disk drive, or memory cards and the related storage control media; and being in the form of RAID, JBOD;
(2) coupled with the network connection media, which could be the controller of Ethernet;
(3) running with operating system which is Linux, Unix, MS Window, or real-time OS; and
(4) containing IP SAN services software modules, which is able to provide management services to distribute control management station through IP based or non-IP based protocols, and to provide block data service to one or more hosts through IP based communication protocols.

14. The method of claim 13, further includes,
(1) a Fiber Channel Based SAN unit appearing as an IP based SAN; and
(2) fiber Channel based SAN containing Fiber Channel.

15. The method of claim 1, further includes that,
(1) the control station is a server or a host, which is a server, a desktop, a laptop system, or a handheld device with memory, storage media, network communication components, CPU and capable to running software applications; and
(2) running with operating system which is Linux, Unix, MS Window, or real-time OS.

16. The method of claim 1, further includes that
(1) the software modules of web-based distributed virtual SAN includes console support software modules, web server software modules and control management software modules on control management station, the service software modules on IP SAN unit, and the service software module of the host; and
(2) the said web server software is a software on the marketing or a proprietary web server software wherein all software modules of web-based virtual SAN are being implemented with C, C++, Java, or XML; and
(3) each software module supports IP based or non-IP based communication protocols depending on the needs and nature of communication link; and
(4) said software modules are complied into binary model and are packed into software installation media of CDROM, DVD-ROM, memory card or transmitted cross network to target system for installing on either control station, IP SAN unit, or host.

17. The method of claim 16, further include that software modules used in web-based out-band accessed distributed virtual SAN infrastructure is a web-based operating system.

18. The methods of claim 1, further include that
(1) the web-based out-band virtual SAN is a central controlled distributed virtual machine (CCDSVM);
(2) the "Virtual SAN automatic configuration protocol" applied to various web-based out-band CCDSVM in forming multiple different type of resource pools or application service pools for unlimited on-demand application;
(3) the IP SAN units in "Virtual SAN automatic configuration protocol" are replaced by web server, video server, file server, security monitoring server, or database server unit; and
(4) these different type of application service pools or resource pools of the distributed virtual machine have dynamic capacity expanding, scalability, performance, disaster recoverability, security, centralized management.

19. The method of claim 1, wherein c) further include that said out-band web-based virtual SAN managing two groups of server systems, the IP SAN units and host systems through web-browser; the group of host systems are capable of constructing a hosts pool with proprietary "Virtual SAN automatic configuration protocol"; and as matter of the fact that more groups of systems can be formed through same methods and to be managed from same web-based management console.

20. The method of claim 9, further include that
(1) the console support software also provides admin staff from storage management console to manually assigning storage volumes to hosts;
(2) any specific storage volume of any IP SAN unit exclusively manually assigned to a specific host as long as admin staff acknowledge any host there is such needs; and
(3) assigning information of the host to said IP SAN unit; and
(4) after each party receiving required information, each said host and each corresponding said IP SAN unit initiating negotiation and further for direct access to avoid said control station to be a bottleneck for data accessing.

* * * * *